United States Patent

[11] 3,624,509

[72] Inventors Emanuele Morici
9, Via Monte delle Gioie;
Carmelo Zimatore, 10, Via del Nuoto, both of Rome, Italy

[21] Appl. No. 848,184
[22] Filed Aug. 7, 1969
[45] Patented Nov. 30, 1971
[32] Priority Aug. 13, 1968
[33] Italy
[31] 39073 A/68

[54] ELECTRICALLY CONNECTED REMOTE CONTROL FOR AUTOMATICALLY TUNED RECEIVER
4 Claims, 6 Drawing Figs.

[52] U.S. Cl. .......... 325/316, 325/391, 325/393, 325/399, 325/458, 325/470, 178/DIG. 15
[51] Int. Cl. .......... H04b 1/06
[50] Field of Search .......... 325/389, 390, 391, 393, 397, 399, 417, 424, 427, 458, 469, 470, 315, 316, 317; 178/DIG. 15

[56] References Cited

UNITED STATES PATENTS

| | | | |
|---|---|---|---|
| 2,051,898 | 8/1936 | Roberts | 325/399 |
| 2,452,384 | 10/1948 | McDonald, Jr. | 325/391 |
| 2,547,984 | 4/1951 | Smith | 325/389 |
| 2,949,532 | 8/1960 | Hill | 325/393 |
| 3,452,282 | 6/1969 | Beres | 325/397 |

*Primary Examiner*—Robert L. Griffin
*Assistant Examiner*—James A. Brodsky
*Attorney*—Cushman, Darby & Cushman

ABSTRACT: A remote control for receivers tuned by means of variable capacity diodes, wherein the turning of a first-knob connects the receiver to the power supply and actuates a volume potentiometer, the turning of a second knob lowers the upper cutoff frequency of the LF response curve by inserting a capacitor across the LF input, a three-position switch controls the waveband ranges, while a further knob switches the set from manual to automatic tuning by switching the base of a transistor to the output of the electronic-tuning circuit, the latter being readied for automatic operation by disconnecting a resistor from ground.

INVENTORS
EMANUELE A. MORICI
CARMELO ZIMATORE
BY
Cushman, Darby & Cushman
ATTORNEYS INVENTORS
EMANUELE A. MORICI
CARMELO ZIMATORE
BY
Cushman, Darby & Cushman
ATTORNEYS INVENTORS
EMANUELE A. MORICI
CARMELO ZIMATORE
BY
Cushman, Darby & Cushman
ATTORNEYS

ELECTRICALLY CONNECTED REMOTE CONTROL FOR AUTOMATICALLY TUNED RECEIVER

The present invention refers to a device for the remote control of electromagnetic wave receivers, and more particularly of receivers with variable capacity diode tuning, especially of the type illustrated in our U.S. Pat. No. 3,467,871.

It is an object of the present invention to overcome the difficulties in installing a complete receiver set where space is at a premium, especially on automobile or motorboat dashboards, which tend to become increasingly crowded with instruments and various gadgets, since the small space requirements of the control device will always render possible its installation on the dashboard, within the easy reach of the driver, while the bulkier receiver proper can be installed in any convenient location of the vehicle.

It is a further object of the invention to supply a device which can be easily installed, together with the receiver it controls, by eliminating all mechanical and electromechanical transmissions (such as bowden cables, relays, motors etc.) from the control device to the various components of the receiver, by rendering said transmission purely electric, so that the connection between control device and receiver may merely consist of electric wires.

For a purely illustrative purpose, an embodiment of the invention will now be described, with reference to the attached drawings, in connection with an autoradio described in the above-quoted allowed U.S. application No. 540,278.

Figure 1:
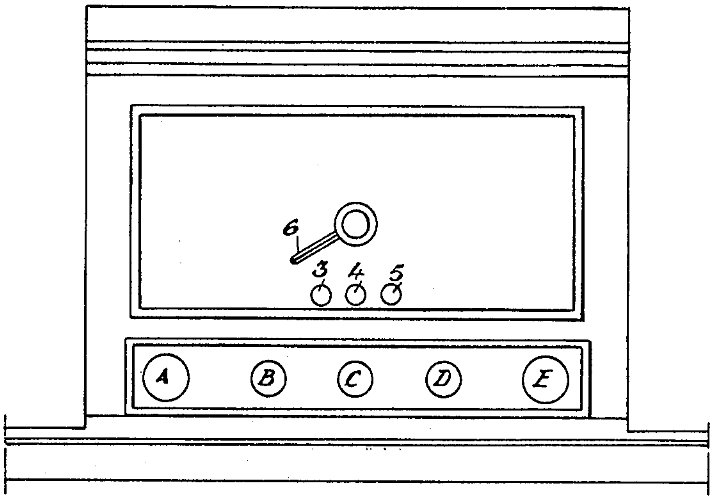
FIG. 1 is a front view of the panel containing the control device according to the present invention.

In FIG. 1, A is the switching-on and volume adjusting knob; B is the tone control knob; C is the band selector knob; D is the knob for switching from distant to local emitters and E is the knob for manual tuning, for the automatic to manual tuning and for starting the scanning device.

The pilot lamps 3, 4 and 5 indicate the selected waveband and the pointer 6 indicates the frequency of the waves being received.

Figure 2:
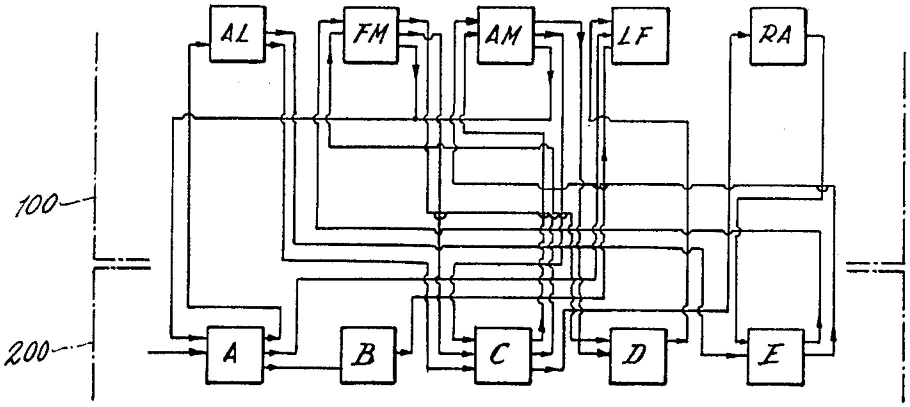
FIG. 2 is a block diagram of the autoradio, the remote control device and their interconnections.
Figures 3, 6:
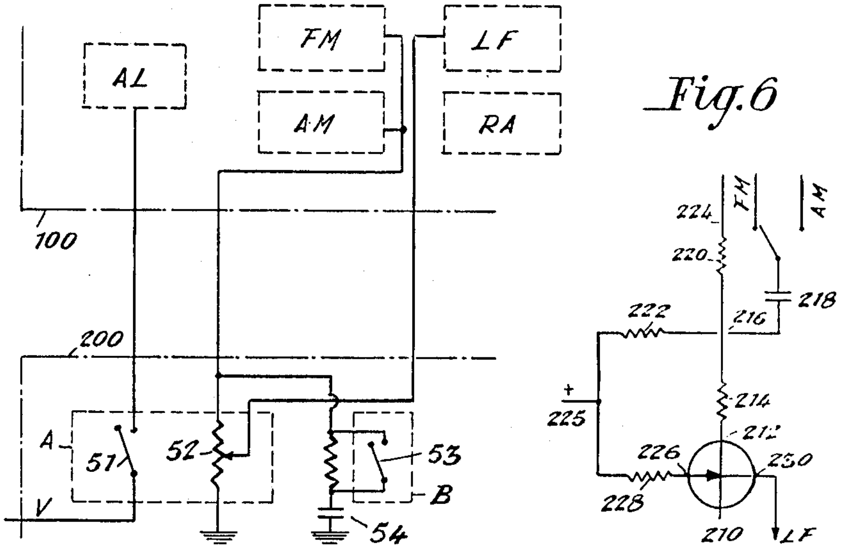
FIG. 3 is a block diagram showing in detail the part which remote controls the switching on, the volume and the tone of the receiver.
FIG. 6 shows the wiring of the LF block.

In FIG. 2, the rectangle 100 defined by the dot-and-dash line indicates the receiver proper, while the similarly defined rectangle 200 delimits the control device. As shown in FIG. 3, the control A consists of a main switch 51 keyed to the shaft of the volume potentiometer 52. By closing switch 51 the battery voltage V is fed to the main supply AL and thence to the various stages of the autoradio. One end of the potentiometer is grounded, its other end is connected with the output of the detecting stages of the amplitude modulation block or section AM and frequency modulation block or section FM, while the sliding contact of the potentiometer is connected with the input of the low-frequency circuit LF. By rotating the volume potentiometer the amplitude of the signal applied to the inputs of LF is varied.

The block B, which controls the tone, consists of a switch 53 which, when closed, connects across the input of LF a capacitor 54 of a capacity such as to lower the upper cutoff frequency of the response curve of LF.

Figure 4:
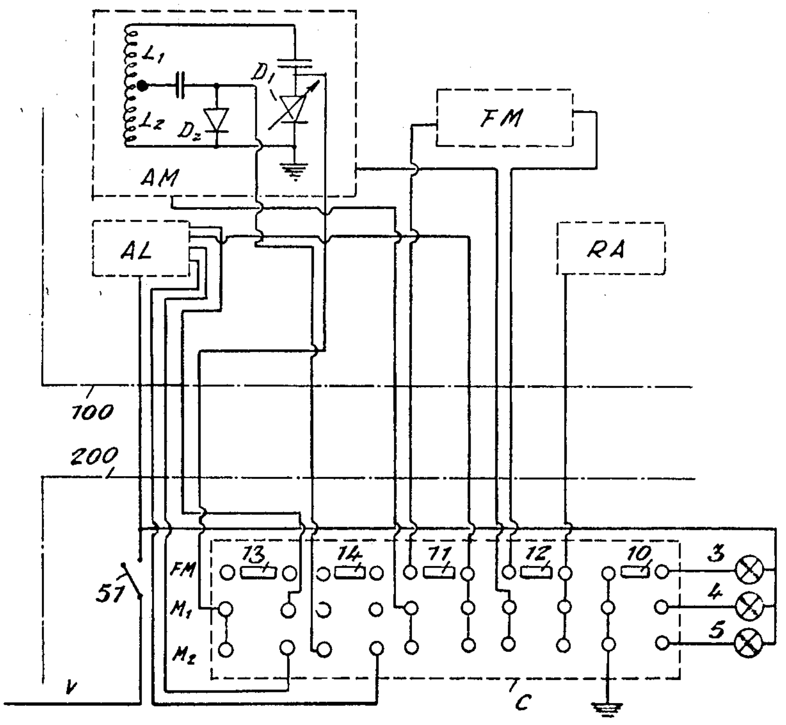
FIG. 4 is a block diagram showing in detail the wiring of the portion which remote-controls the waveband switch.

The band selector block (FIG. 4) consists of sliding multiple switch C with three positions: FM, $M_1$, $M_2$. In the FM position, a sliding contact 10 of switch C lights the pilot lamp 3 relating to the FM band and simultaneously connects with the block AL, by means of the sliding contact 11, the block FM with the stabilized voltage coming from the main supply AL; its other contact 12 connects the output of the ratio detector of the FM block with the input of the electronic-tuning circuits for the automatic scanning of the emitter (block RA). In the $M_1$ position, the sliding contact 10 of the switch C causes the lighting of the pilot lamp 4; its sliding contact 11 connects the bloc AM with the block AL; its contact 12 connects the output of the ratio detector of the block AM with the input of the RA circuits; the switch biases with its contact 13 the variable capacity diode $D_1$ of the oscillator so that the magnitude of the capacity imparted to $D_1$ by the bias permits the tuning of the waveband $M_1$, with its contact 14 it causes the blocking of the switching diodes $D_2$ by biasing them with a reverse voltage so that they act as a circuit open for the radiofrequency currents; the inductors $L_1$ and $L_2$, which may form part of the antenna transformer or of the radiofrequency transformer or of the oscillator transformer, result thereby to be series connected among them and their inductances combine.

In its third position $M_2$ the switch C causes by its contact 10 the lighting of the pilot lamp 5; by its contact 11 it connects the feed of the AM block; by its contact 12 it connects the output of the discriminator of the AM block with the RA block; by its contact 13 it biases the variable capacity diode $D_1$ of the oscillator so that the magnitude of the capacity due to the bias of $D_1$ permits the tuning of the band $M_2$; with its contact 13 it renders conducting the switching diodes $D_2$, polarizing them with a direct voltage, so that they act as a short circuit for the radiofrequency current; thereby the inductor $L_2$, which may form part of the antenna transformer or of the radiofrequency transformer or of the oscillator transformer, now results to be short-circuited and the inductance of the group $L_1$ and $L_2$, is only that of $L_1$.

Figure 5:
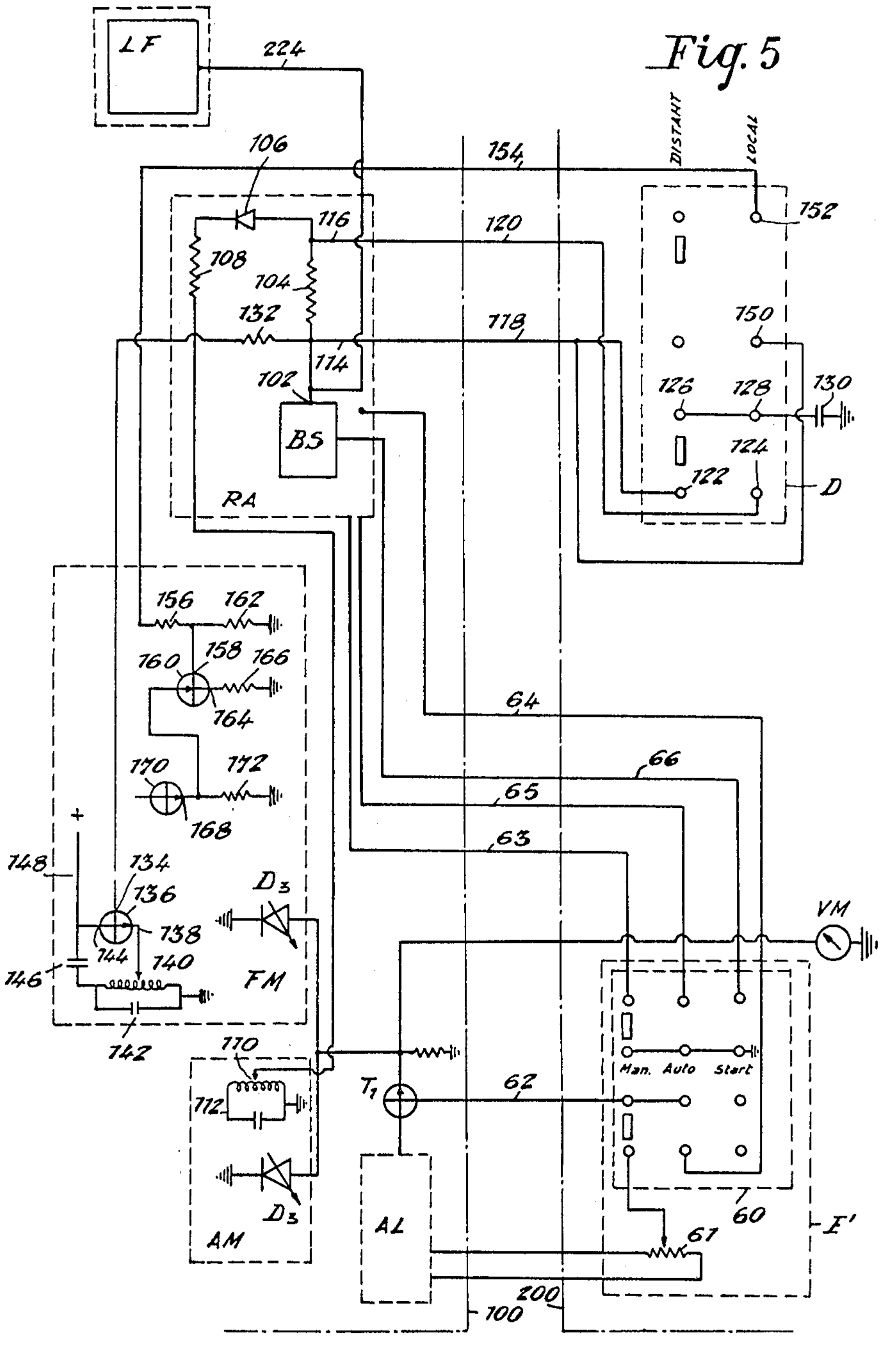
FIG. 5 is a block diagram showing in detail the wiring of the portion which remote-controls manual tuning, the automatic-manual tuning, the starting of the automatic-emitter-scanning device and the switching from distant to local stations.

With reference to FIG. 5, the block 4 switching from distant to local stations consists of a double switch which in the "local" position brings about the desired desensitizing of the receiver, by bringing to a convenient potential the automatic volume control line, both for the FM and the AM receptions, while the RA block is desensitized by changing, through the insertion of convenient resistors, the operating points of the amplifying transistors so as to vary the gain of some stages of the RA block.

In the "distant" position the biases are such as to completely utilize the sensitivity of the autoradio, both for the automatic volume control line and for the RA block.

In particular, the desensitizing of the AM group is obtained by means of the following circuit: a service bistable circuit BS forming part of the RA block and actuated only during the automatic scanning, has its output 102 connected, through a resistor 104 of comparatively high resistance, to a diode 106 and a additional resistor 108 of a comparatively low resistance, which are all interconnected in series, to a tap 110 of an intermediate frequency filter 112 of the AM group. Furthermore the two terminals 114 and 116 of the resistor 104 are respectively connected, through conductors 118 and 120, to the stationary contacts 122 and 124 of the double switch D. To the contacts 126 and 128 of the double switch D is connected one terminal of the capacitor 130, whose other end is grounded. In this manner, since the bistable circuit BS supplies a positive output with respect to ground only while the automatic scanning occurs, when the switch D is in the "distant" position, across the filter 112 a comparatively high resistance is placed, which does not influence the operation of this filter, while if the switch D is placed to the "local" position, across said filter a comparatively low resistance is placed, whereby the output of the filter 112 is reduced causing the desired desensitization. When the scanning is completed, the output of the bistable circuit BS becomes again negative and therefore the diode 106 blocks and the filter 112 is freed from any additional load.

The desensitization of the FM group is obtained through the following circuit: the output 102 of the bistable circuit BS is connected, through a convenient resistor 132, to the base 134 of a transistor 136 which acts as a variable load for the F1 filter 142. The transistor 136 is in fact connected through its emitter 138 to a tap 140 of the filter 142 of the FM block and with its collector 144, through a capacitor 146, to the end of said filter 142. Furthermore, the collector 144 is also connected, through a conductor 148, to a source of a positive continuous bias voltage.

The output of the bistable circuit BS is also fed to the stationary contact 150 of switch D, while the contact 152 is connected, through a conductor 154 and a resistor 156, to the base 158 of a transistor 160. The output of the bistable circuit BS is also fed to the stationary contact 150 of the switch D, while its contact 152 is connected, through a conductor 154 and a resistor 156, to the base 158 of a transistor 160. Said base 158 is also connected to ground through a resistor 162. The collector 164 of the transistor 160 is connected to ground through a resistor 166; the emitter of the transistor 160 is connected to the emitter 168 of the radiofrequency amplifying transistor 170 of the block FM. The emitter 168 is also connected to ground by means of a resistor 172 having a comparatively high resistance.

The operation of the FM desensitizer is the following: each time the scanning of the station is being performed, the bistable circuit BS acts upon the transistor 136 which loads the filter 142 thereby decreasing the amplitude of the signals.

Furthermore, if one desires to tune in a local station, the radiofrequency amplification of the transistor 170 is prevented and this is obtained since the bistable circuit BS causes the blocking of the transistor 160 and the resistor 172 has such a high resistance as to bias the transistor 170 at a point wherein the amplification is nil.

For the scanning of a distant station the transistor 160 conducts and its conduction current, adjusted by its base and emitter resistors, is such as to bring the operating point of the transistor 170 into the position of maximum amplification.

It must be noted that the use of the transistor 136 limits the circulation of the radiofrequency current in the connections towards the remote control, while the use of the transistor 160 permits to obtain an operating point of the transistor 170 which is independent of the characteristics of said transistor 170. This would not be possible when using a diode in lieu of the transistor 160.

In a first position of axial translation of the knob E connected to the three-position switch 60 of the autotune control means, the block E′ of this switch remote controls the manual tuning and in a second position remote-controls the insertion of the automatic tuning of block or section RA, the starting of the station scanning being obtained by pressing said knob E toward a third unstable position, said knob returning into its second position as soon as it is left free.

The knob E is connected with the potentiometer 61 of the block E′. In its first position said potentiometer has its terminals connected to the two continuous voltages derived from the supply AL. Therefore on the sliding contact there is present a voltage which is intermediate between those of the two continuous reference voltages, as a function of the position of said sliding contact. This voltage is carried through conductor 62 to the interior of the receiver proper, where it serves for biasing the variable capacity diodes $D_3$ of the receiver, after having passed through the separating stage consisting of a transistor $T_1$ connected with the common collector. Simultaneously the multiple switch 60 prepares block RA for manual tuning by grounding the conductor 63.

In its second position the base of transistor $T_1$ is disconnected from the potentiometer 61 and is connected to block RA which now supplies the bias voltage of the variable capacity diodes $D_3$ through the conductor 64 and thereby brings about the automatic tuning, while the block RA is prepared for automatic operation by grounding the conductor 63.

With reference to FIG. 6: when pressing the knob E from said second position, the automatic scanning of a new emitting station is started and this is obtained by the switch 60 in the "-start" position by grounding the conductor 66 coming from the RA block.

In fact, by grounding the conductor 65 the bistable circuit BS is actuated and passed into the automatic scanning position, in which position said bistable also causes the silencing of the LF block by means of a convenient circuit. In fact the preamplifying transistor 210 of block LF has its base 212 connected to one end of a resistor 214. The other terminal of resistor 214 is connected to the junction point 216 of a capacitor 218, a resistor 220 and a resistor 222. The capacitor 218 is connected to the outputs of the AM and FM blocks, the resistor 220 is connected, through a conductor 224, to the output 102 of the bistable BS and the resistor 222 is connected to a source of continuous bias voltage. Also the emitter 226 of transistor 210 is connected to the source of continuous voltage through a resistor 228. The collector 230 of the transistor 210 is instead connected to the LF amplifier in the usual manner.

When the bistable BS is in the rest position the transistor 210 is conducting, while when the bistable is in its scanning position, the transistor 210 is blocked, because of its new bias, and therefore the LF block is silence.

As indicated, the start position has an automatic return so that as soon as it is released, the knob E returns to its second position and the RA block is ready to tune in a new emitting station.

The dial is obtained by connecting a voltmeter VM with the emitter of the transistor $T_1$ and with the ground. In this manner the voltmeter indicates the voltage across the variable capacity diodes $D_3$ and therefore indirectly the frequency of the station to which the autoradio is tuned.

It is clear that the present invention is not limited to the embodiment here described, and all its variants are encompassed within the scope and idea of the invention.

What we claim is:

1. A remote control device for remotely controlling an automatically tuned AM-FM electromagnetic wave receiver having AM, FM and automatic electronic-tuning sections providing automatic tune-scanning from one received station to the next, which receiver is separately located from said remote control device and operatively connected therewith by only electric conductors, said remote control device comprising:

a switch-on and volume control means connected by electric conductors with an electrical supply for said receiver, a tone switch control means connected through an electric conductor to control the tone of said receiver, a band selection control means connected by electric conductors with FM and AM band sections of said receiver for selective enabling thereof, a local-distant switch means connected with said receiver by electric conductors to desensitize, in a "local" position of said switch means, the FM, AM and automatic tuning sections of said receiver, and an autotune control means connected by electric conductors to said receiver for manually tuning said receiver via a continuously variable electrical signal, for electrically switching from manual to automatic electronic tuning of the receiver, and for electrically starting an automatic tune-scanning cycle operation within said receiver, wherein said autotune control means comprises:

a potentiometer means for providing a continuously variable manual-tuning voltage to said receiver, said manual-tuning voltage having a value corresponding to the positioning of a movable wiper in said potentiometer means, a three-position switch means for switching said receiver between a manual-tuning mode, an automatic-tuning mode and a start-scanning mode, and a slidable shaft means physically connecting said potentiometer means and said three-position switch means for actuation thereof, said three-position switch means electrically disabling, in a first manual-tuning position, the automatic tuning section of said receiver and electrically connecting said potentiometer to an electrical tuning circuit of said receiver whereby said manual-tuning voltage is effective to tune said receiver in response to movements of said slidable shaft means, said three-position switch means electrically enabling, in a second automaticttuning position, the automatic-tuning section and simultaneously starting an automatic-tuning scan cycle to cause the receiver to scan until a suitable electromagnetic wave signal is received, said three-position switch means electrically restarting, in a third starting position, an automatic-tuning scan cycle to cause the receiver to again start scanning until the next available electromagnetic wave signal is received, and wherein the band selection control means comprises:

a sliding multiple three-position switch means which, in a first, FM position, connects the FM section to a voltage supply, and connects a ratio detector of said FM section with the input of the automatic tuning section; in a second and third position, for two bandwidths in an AM range, connecting the AM section with a power supply, the output of an AM section ratio detector with the input of the AM sections, feeds to a variable capacity diode of an oscillator in the AM section a bias to permit tuning in each AM range; in the third position causes a switching diode to become conducting thereby short-circuiting part of a frequency selective inductor circuit in the AM section.

2. A remote control device as in claim 1 wherein the local-distant control means comprises:

a double switch means which in its "local" position desensitized the automatic tuning section of the receiver by changing, through the insertion of resistors, the operating points of amplifying transistors therein to thereby vary the gain of some stages of the automatic-tuning section.

3. A remote-control device according to claim 1 wherein the switch-on and volume control means comprises:

a main switch connecting a receiver supply to a source of electricity, and a potentiometer having one terminal thereof grounded and, another terminal connectable with detector stages of the AM section and FM section a sliding contact of said potentiometer being connected to a low-frequency circuit input thereby adjusting the amplitude of signals applied to the input of low frequency circuit.

4. A remote control device according to claim 1 wherein the tone switch control means comprises:

a switch means connecting, in its closed position, a capacitor across a low frequency circuit input in order to lower the upper cutoff frequency of the low frequency response curve.

* * * * *